(12) United States Patent
Jarvenpaa et al.

(10) Patent No.: US 8,923,903 B2
(45) Date of Patent: Dec. 30, 2014

(54) SYNCING HISTORY INFORMATION

(75) Inventors: Marko Jarvenpaa, Hyvinkaa (FI); Frans Tuomela, Helsinki (FI); Antti Pihlajamaki, Helsinki (FI)

(73) Assignee: Teliasonera AB, Stockholm (SE)

( * ) Notice: Subject to any disclaimer, the term of this patent is extended or adjusted under 35 U.S.C. 154(b) by 0 days.

(21) Appl. No.: 13/979,319

(22) PCT Filed: Jan. 20, 2012

(86) PCT No.: PCT/FI2012/050052
§ 371 (c)(1),
(2), (4) Date: Jul. 11, 2013

(87) PCT Pub. No.: WO2012/098299
PCT Pub. Date: Jul. 26, 2012

(65) Prior Publication Data
US 2013/0303211 A1    Nov. 14, 2013

(30) Foreign Application Priority Data
Jan. 21, 2011    (FI) ........................................ 20115060

(51) Int. Cl.
*H04W 4/16* (2009.01)
*H04L 12/58* (2006.01)
*H04L 29/08* (2006.01)

(52) U.S. Cl.
CPC ............... *H04W 4/16* (2013.01); *H04L 12/586* (2013.01); *H04L 51/16* (2013.01); *H04L 67/1095* (2013.01); *H04L 12/5895* (2013.01)
USPC ........................................... 455/466; 709/206

(58) Field of Classification Search
CPC ..................................................... H04W 4/12
USPC ............... 455/466, 558, 411, 456.2; 709/206
See application file for complete search history.

(56) References Cited

U.S. PATENT DOCUMENTS

| 6,810,405 | B1 | 10/2004 | LaRue et al. |
| 2009/0163244 | A1 | 6/2009 | Parkkinen et al. |
| 2009/0203389 | A1 | 8/2009 | Bhat |
| 2010/0222089 | A1* | 9/2010 | Russell et al. ................. 455/466 |
| 2011/0076987 | A1* | 3/2011 | Lee et al. ....................... 455/411 |

FOREIGN PATENT DOCUMENTS

| EP | 2405366 A1 | 11/2012 |
| WO | 03044698 A1 | 5/2003 |
| WO | 2010089401 A2 | 8/2010 |

OTHER PUBLICATIONS

International Search Report for International Application No. PCT/FI2012/050052, filed Jan. 20, 2012, (International Publication No. WO 2012/098299, published Jul. 26, 2012), dated as mailed Apr. 12, 2012.
International Preliminary Report on Patentability for International Application No. PCT/FI2012/050052, filed Jan. 20, 2012, (International Publication No. WO 2012/098299, published Jul. 26, 2012), dated as completed May 6, 2013.

* cited by examiner

Primary Examiner — Phuoc H Doan
(74) Attorney, Agent, or Firm — Cozen O'Connor (57) ABSTRACT

To enable syncing communication-specific history information on apparatuses of a user, one of which may be a legacy apparatus, in a multi-apparatus environment, to correspond to each other, communication-specific history information is also maintained in a network, and in response to an event changing the communication-specific history information, it is also updated in the network, and by means of the information in the network, corresponding communication-specific history information in the user's other apparatuses can be updated.

20 Claims, 4 Drawing Sheets

SYNCING HISTORY INFORMATION

FIELD

The invention relates to the field of telecommunications, and particularly to syncing communication-specific history information among two or more user equipments a user may use.

BACKGROUND

One feature provided by the evolution of wireless cellular communications technologies, especially generic access networks, and the use of different gadgets by one user, is that a short message, for example, send to a user, is actually delivered to two or more gadgets of the user, like a legacy mobile terminal and a smartphone supporting Internet Protocol (IP) multimedia services. However, for the time being, when the user reads the message using one of the apparatuses, the message history information in the other apparatus(es) shows the message as unread. Thus, the user cannot trust the communication-specific history information in one of his/her gadgets, and thereby cannot be sure whether or not he/she has read a particular message. In order to find that out, the user needs to check all his gadgets.

SUMMARY

An object is to provide a method and an apparatus for implementing the method so as to enable syncing communication-specific history information on the user's apparatuses to correspond to each other. The object is achieved by methods, an apparatus, a computer program product and a system which are characterized by what is stated in the independent claims. Preferred embodiments are disclosed in the dependent claims.

An aspect is based on the idea of also maintaining communication-specific history information in a network, performing an update in response to an event changing the communication-specific history information in the apparatus, the update being performed in the apparatus and in the network, and using the communication-specific history information in the network to update corresponding communication-specific history information in the user's other apparatuses.

An advantage provided by the above feature is that it enables syncing of the communication-specific history information in the user's different apparatuses. For example, if the user reads a short message by using his legacy apparatus, the short message becomes updated as read also in the user's other apparatuses.

BRIEF DESCRIPTION OF THE DRAWINGS

In the following, the invention will be described in greater detail by means of preferred embodiments with reference to the attached drawings, in which.

DETAILED DESCRIPTION OF SOME EMBODIMENTS

Exemplary embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any user device (i.e. user equipment), messaging server, history information maintaining server, any corresponding component, any corresponding apparatus, and/or to any communication system or any combination of different communication systems supporting different user selections relating to waiting messages. The communication system may be a wireless communication system or a communication system utilizing both fixed networks and wireless networks. The protocols used and the specifications of communication systems, and apparatuses, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of an architecture to which the embodiments may be applied, an IMS (IP multimedia subsystem) architecture supporting a short message service over IP network without restricting the embodiments to such an architecture, however. The IMS enabler provides a framework by defining a horizontal enabler built on top of a SIP (Session Initiation Protocol)/IP core infrastructure system. This framework comprises a set of functional components and interfaces that have been designed to facilitate easy deployment of existing and future communication services. For example, the IMS enabler supports full instant messaging, other IP multimedia messaging, and transparent interworking with legacy mobile messaging services in a multi-addresses and multi-apparatus (multi-device) environment. All IMS-based services will use functional components, different servers, and interfaces provided by the framework. Non-IMS communication services require interworking functions. However, the details of IMS are not essential and are therefore not described or illustrated in more detail herein.

Examples of systems supporting IMS, or corresponding solutions, like CPM (Converged IP Messaging), include 3GPP (third generation partnership) IMS, 3GPP2 IMS, 3GPP SAE (System Architecture Evolution), $4^{th}$ generation systems, and Mobile Broadband.

Figure 1:
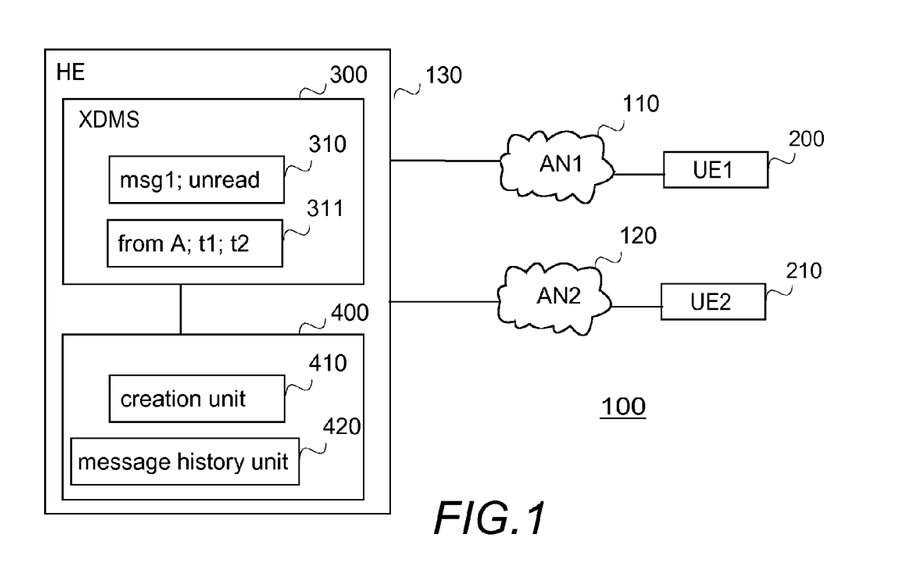
FIG. 1 shows a simplified architecture of a system and schematic diagrams of apparatuses according to an embodiment.

FIG. 1 is a simplified architecture only showing some functional entities and elements used below when describing different embodiments and relating to the message recipient. The entities and elements shown are logical units whose implementation may differ from what is shown. The connections shown in FIG. 1 are logical connections; the actual physical connections may be different. It is apparent to a person skilled in the art that a communication system also comprises other functions and structures. It should be appreciated that the functions, structures, elements and the protocols used in or for messaging and/or calls are irrelevant to the actual invention. Therefore, they need not be discussed in more detail here.

In the illustrated exemplary system 100 user B has two user equipments, a legacy user equipment (UE1) 200, and an advanced user equipment (UE2) 210 supporting IP messaging, both attached to the system via a corresponding access network 110 or 120. It should be appreciated that a roaming advanced user equipment that has set data roaming off corresponds to the legacy user equipment since it can receive messaging messages as if it were a legacy user equipment (i.e. only as short messages sent over a signalling channel, not over data traffic channels). Below, term "legacy user equipment" also covers advanced user equipments in a data transfer blocked mode (i.e. data roaming is off). Further, it should be appreciated that herein, the term "advanced user equipment" means a user equipment that is not a legacy user equipment. The user equipments will be described in more detail below.

Examples of access networks include GSM, GPRS, WiFi, WiMax, Mobile Broadband Wireless Access (MBWA), LTE (Long Term Evolution), LTE advanced, and beyond. It should be appreciated that if the user has, for example, two advanced user equipments, the user is roaming and data roaming is allowed only to one of the user equipments, the user equipments may be attached to the same access network (in which case the access networks 110 and 120 in FIG. 1 both illustrate the same access network).

The illustrated network entities in user B's home environment 130 comprises an XML document data management server 300 (XDMS) and an instant messaging server (IM server) 400 delivering IP multimedia services, both servers being computing apparatuses providing corresponding server functionalities. It should be appreciated that XDMS represents herein one type of a document server, and any other type may be used as well (the document server may be for documents of the type other than XML, for example). Further, the IM server represents any server delivering multimedia services, or corresponding data traffic services.

In the illustrated embodiment, the instant messaging server comprises an entry creation unit 410 for creating a message-specific entry for message status history information to the XDMS, and a history function 420 (or a corresponding unit) for user B. In the illustrated implementation, one history function is provided for the connection-specific history information. However, the history function may be split into more dedicated history functions; e.g. into a status history function and a log history function, or a message history function maintaining status and log information on messages, and a call history function maintaining log information on calls, or a status history function, a message log history function and a call history function, for example.

In the illustrated example, the XML document data management server 300 (XDMS), comprises one or more entries containing history information. The history information may be communication related status information or communication related log information. Status information typically relates to received messages (unread, read), whereas log information may relate to calls (dialled to, received from, missed from) or messages (sent to, received from). Typically, log information stores recently dialled, received, and missed calls in one combination of lists or in one list and recently sent to and received from messages in another, separate combination of lists or list. It should be appreciated that log information may store log information on other types of information use/exchange, e.g. visited web pages or information on data traffic. FIG. 1 shows one status information related entry 310 comprising information by which the entry may be associated with a specific message, and status information on the message (i.e. message is read or unread). FIG. 1 also shows one log information related entry 311 comprising information on a received call. In the illustrated example, information on the received call indicates the caller (A), the time (t1) when the call was answered, and duration (t2) of the call. It should be appreciated that any other type of log information may be stored in an entry and that there may be any kind of additional information (like the duration of the call) or no additional information.

Documents, like the entries described above, in the XDMS are retrieved, deleted and manipulated by using an application layer protocol for document services, called an XML Configuration Access Protocol (XCAP). Further, the SIP, for example, allows a client in an advanced user equipment to subscribe and receive notifications when a document is added, deleted or updated in the XDMS.

In another embodiment of the invention, the history function locates in the XDMS. In a further embodiment the IMS server may contain a status history function for subscriber B and the XDMS a log history function for subscriber B, or vice versa. Thus, it bears no significance in which server the history function, or history functions, is/are located.

Although the apparatuses, such as the user equipments and the servers, have been depicted in FIG. 1 as one entity, they may be implemented in one or more physical or logical entities. Their units and functions may be software and/or software-hardware and/or firmware components (recorded indelibly on a medium such as read-only-memory or embodied in a hard-wired computer circuitry).

The examples illustrated in FIGS. 2 to 5 relate especially to status information and, as an example of a communication, they use text/character string messaging, such as a short message, an instant message or an unstructured supplementary service data (USSD) message, without limiting the examples to such a communication. It should be appreciated that the examples are implementable with any type of communication.

Further, in the examples illustrated in FIGS. 2 to 5, a hash value is used as an example of an identifier that may be used to identify a message whose status is updated. The hash value may be calculated from a combination of the contents of the message and the sender of the message. Further, the sending time may also be taken into account when the hash is calculated, or the sending time may replace the contents or the sender. However, instead of the hash value, any other means that unambiguously enough identifies a communication whose status is updated may be used. For example, instead of calculating the hash value, the message may be identified by the consecutive number of the message (i.e. a number indicating how many messages has been received when the message in question was received), and/or by the exact sending time of the message and/or certain amounts of characters from the beginning and/or end of the message. The sender may also be combined with one or more of the above means for identifying the message.

Figure 2:
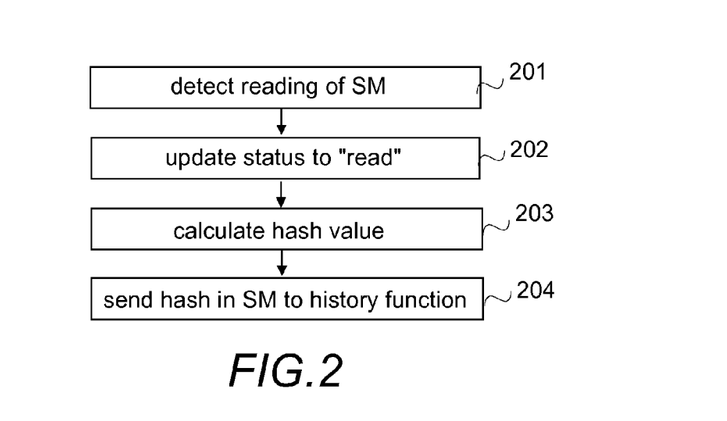
FIG. 2 is a flow chart illustrating a functionality of a user equipment according to an embodiment.

FIG. 2 is a flow chart illustrating a functionality of a user equipment, such as a legacy user equipment, according to an embodiment. In the embodiment, when the user equipment detects, in step 201, that an unread received short message is read by the user, it updates, in step 202, in the user equipment the message status as read. Further, the user equipment calculates, in step 203, a hash value from the message contents and sends, in step 204, the hash value in a short message to the history function in the home network of the user who is using the user equipment.

Figure 3:
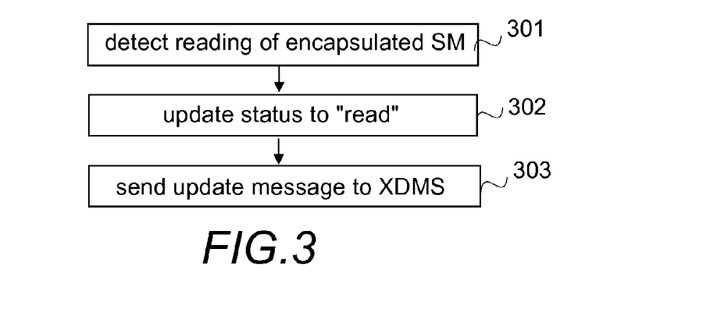
FIG. 3 is a flow chart illustrating a functionality of a user equipment according to another embodiment.

FIG. 3 is a flow chart illustrating a functionality of a user equipment, supporting IP-based messaging, such as an advanced user equipment, according to an embodiment. In the embodiment, when the user equipment detects, in step 301, that an unread short message that was received encapsulated in an IP message type message has been read by the user. Therefore, the user equipment updates, in step 302, in the user equipment the message status as read. Further, the user equipment sends, in step 303, a message to the XDMS in the home network of the user who is using the user equipment to update the corresponding entry, i.e. the corresponding history document in the XDMS.

Figure 4:
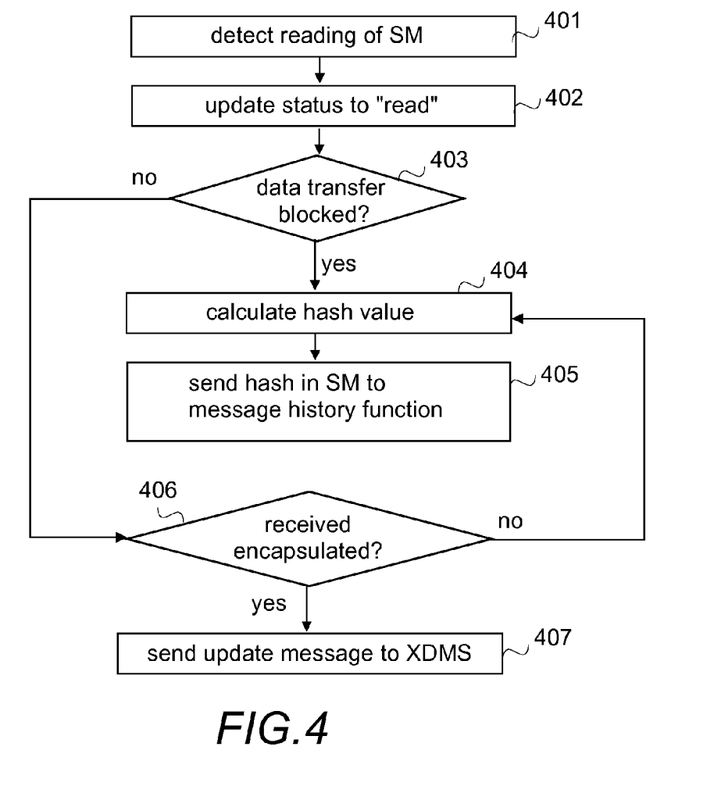
FIG. 4 is a flow chart illustrating a functionality of a user equipment according to yet another embodiment.

FIG. 4 is a flow chart illustrating a functionality of a user equipment, supporting IP-based messaging, such as an advanced user equipment, according to an embodiment. In the illustrated example, when the user equipment detects, in step 401, that a user is reading an unread short message, the user equipment updates, in step 402, in the user equipment the message status as read. Then the user equipment checks, in step 403, whether the user equipment is in a mode in which data transfer is blocked (data roaming is set off, for example). If yes, the user equipment calculates, in step 404, a hash value from the message contents and sends, in step 405, the hash value as a short message to the history function in the home network.

If the data transfer is not blocked, the user equipment checks, in step 406, whether the message was received as a short message or whether it was encapsulated in an IP message type message. If the message was received as a short message via a short message centre (i.e. not encapsulated), the user equipment proceeds to step 404 to calculate the hash value. If the message was received as an encapsulated message (step 406), the user equipment sends, in step 407, a message to the XDMS to update the corresponding history document.

Figure 5:
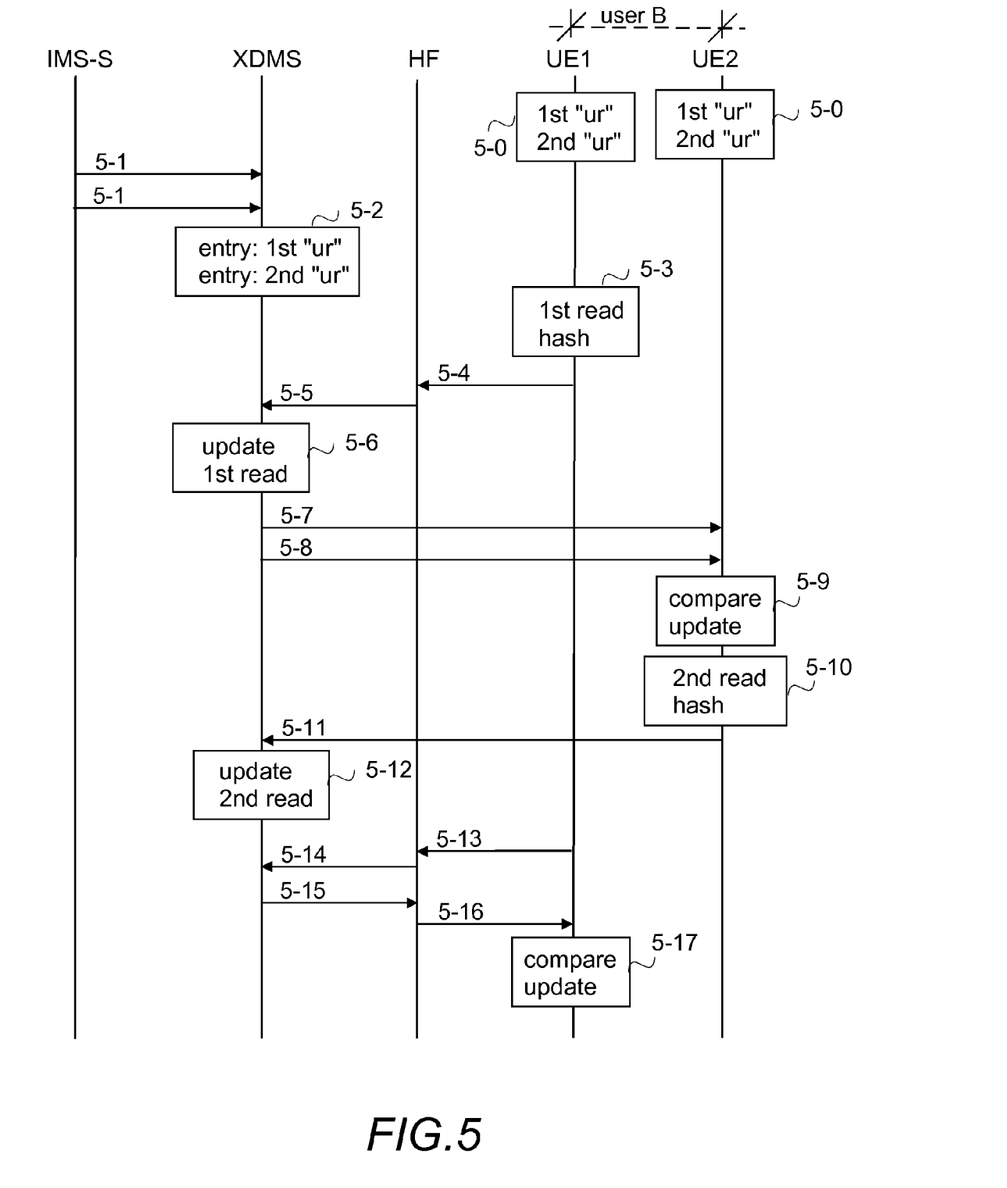
FIG. 5 is a signalling chart illustrating an embodiment.

FIG. 5 is a signalling chart illustrating a signalling example in which user B, who uses UE1 and UE2, has received a first message and a second message, both messages being successfully delivered to both user equipments and still unread (ur), illustrated by points 5-0, and therefore, after receiving acknowledgements of the deliveries, the IMS server (IMS-S) of user B sends messages 5-1 to the XDMS in user B's home network. Both messages 5-1 create, in point 5-2, a new entry to the history document in the XDMS for the corresponding "short message sent to B" using an XCAP PUT operation.

User B decides to read, in point 5-3, the first message by the UE1 which is a legacy user equipment. Therefore, in point 5-3, the UE1 calculates a hash value, and sends a message 5-4 to a history function (HF) for user B, the message 5-4 being a short message containing the hash value.

Then the history function marks the first message as read by sending a message 5-5 to the XDMS. The message 5-5 may be an XCAP PUT operation. In response to the message 5-5, the XDMS updates the status of the first message as read, in point 5-6, and sends a message 5-7 to the UE2, which is an advanced user equipment and has subscribed change monitoring. The message 5-7 may be a SIP event notification extension. Depending on an implementation, the message 5-7 may or may not be sent to the UE1, and the UE1 may be configured to process the message 5-7 as an acknowledgement of the message 5-4.

In response to the message 5-7, the UE2 retrieves the status information of the first message from the XDMS (illustrated by messages 5-8). Then the UE2 identifies the message to which the update relates by means of the hash value in the message 5-7 and hash values calculated by the UE2 on short messages in the UE2. When the message is identified, the UE 2 compares, in point 5-9, received status information of the first message with the status information of the first message, stored in the UE2, notices that they differ (received status is read, stored status unread), and updates, in point 5-9, the stored status information of the first message as read. In other words, the fact that the message was read in the legacy user equipment (or data blocked advanced user equipment) is thus distributed to the user's advanced user equipments so that they also show the message as read (no longer unread).

Then the user takes the user equipment UE2 and notices that there is still an unread short message, the second message. User B decides to read, in point 5-10, the second message by the UE2, and because of reading the message, the UE2 calculates, in point 5-10, a hash value. Since the UE2 is an advanced user equipment, the UE 2 sends a message 5-11 to the XDMS. The message 5-11 may be an XCAP PUT operation, indicating the change of status and containing the hash value. In response to the message 5-11, the XDMS updates the status of the second message as read, in point 5-12.

In the example, the UE1 is configured to periodically retrieve updates to the history documents (entries) from the XDMS by sending a message 5-13 (an update request) to the history function, the message 5-13 being a short message or a UUSD message inquiring changes to documents in the XDMS. Therefore the history function sends a message 5-14 to the XDMS. The message 5-14 may be a conditional XCAP GET operation. In response to the message 5-14, the XDMS sends the changes that have taken place after the last operation from the history function in a message 5-15 to the history function. The history function then forwards the received information in a message 5-16 to the UE1, the message 5-16 being a short message (or an USSD message).

The UE1 identifies the message to which the update relates by means of the hash value in the message 5-16 and hash values calculated by the UE1 on short messages in the UE1. When the message is identified, the UE1 compares, in point 5-17, received status information of the second message with the status information of the second message stored in the UE2, notices that they differ (received status of the second message is read, stored status of the second message is unread), and updates, in point 5-17, the stored status information of the second message as read. Now the history information in the legacy user equipment corresponds to the history information in the advanced user equipment.

It should be appreciated that both user equipments may be configured to periodically retrieve the history information or both user equipments are configured to subscribe to monitor changes, or the legacy user equipment is configured to subscribe and the advanced user equipment is configured to periodically retrieve. Further, if the advanced user equipment is roaming with data roaming off, it may be configured to periodically retrieve the history information using short messages or USSD messages, or to retrieve the history information in response to the data traffic becoming allowed again (i.e. when the roaming ends or data roaming is switched on).

Further, when the hash is used as an identifier, it depends on the implementation whether hash codes once calculated are stored by the user equipment so that they can be used later, or never stored. If they are stored, the user equipment may be configured to calculate the hash code when the message is received, or when either the message is read or a status information update message is received. When the hash codes are not stored in the user equipment, the user equipment may be configured to calculate hash codes only on messages having unread as status.

Figure 6:
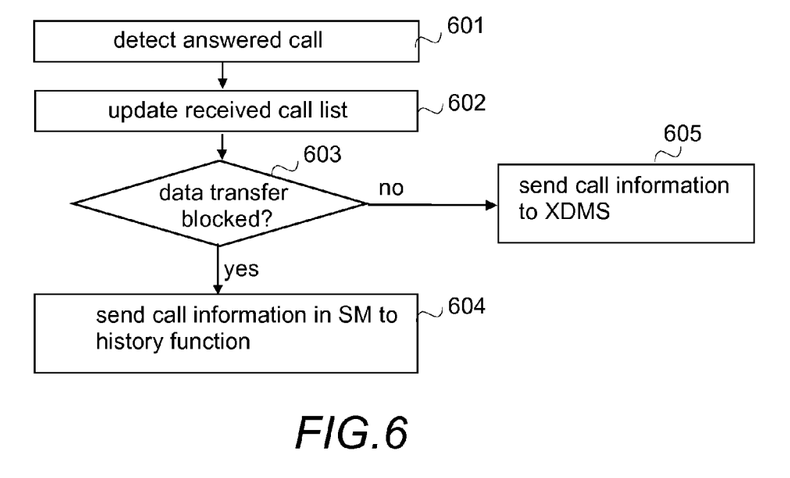
FIG. 6 is a flow chart illustrating a functionality of a user equipment according to a further embodiment.
Figure 7:
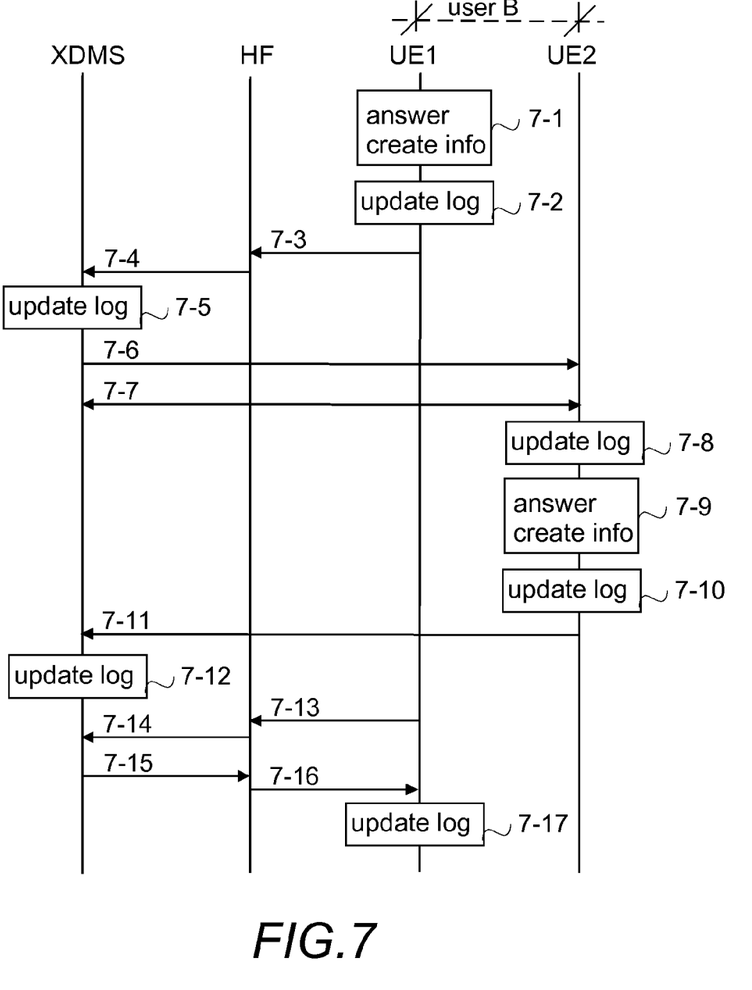
FIG. 7 is a signalling chart illustrating an embodiment.

Although the above illustrated message status information updates may be implemented as such to the log history information (i.e. to different log lists), FIGS. 6 and 7 illustrate another implementation relating to log history information, and the illustrated examples relate to a call received by the user. It should be appreciated that regardless of the log history information type the same procedures may be used.

FIG. 6 is a flow chart illustrating functionality of a user equipment supporting IP-based messaging. Referring to FIG. 6, when the user equipment detects, in step 601, that a user has answered a call and the call has ended, the user equipment updates, in step 602, the received calls list maintained in the user equipment with information on the call. The call information may include, in addition to the caller's phone number or other identifying information, the time the call was answered, the duration of the call, and/or information on the user equipment with which the call was answered. Then the user equipment checks, in step 603, whether the user equipment is in a mode in which data transfer is blocked. If yes, the user equipment sends, in step 604, the call history information as a short message to the history function in the home network.

If the data transfer is not blocked, the user equipment sends, in step 605, a message to the XDMS to create an entry containing the call history information, or an update message to the XDMS to update the corresponding log list with the call history information.

In another embodiment, instead of step 604, the user equipment may be configured to mark the call information as not sent, and when the data transfer is again allowed, to continue in step 605 to send each call information marked "not sent", and then to delete the mark from the corresponding call information.

If the user equipment is a legacy user equipment, the user equipment may be configured to perform the steps 601, 602 and 604.

FIG. 7 is a signalling chart illustrating a signalling example in which user B uses UE1 and UE2. The user notices that both UE1 and UE2 are ringing and answers, in point 7-1 to the call by the UE1 which is a legacy user equipment. Then, in point 7-1, the UE1 creates log information on the call, and when the call ends, updates, in point 7-2, the corresponding log, i.e. the received calls list, in the UE1 with the log information. Then, or simultaneously, the UE1 sends message 7-3 to a history function (HF) for user B, the message 7-3 being a short message containing the log information.

Then the history function updates the history information by sending a message 7-4 to the XDMS. The message 7-4 may be an XCAP PUT operation. In response to the message 7-4, the XDMS updates, in point 7-5, the received calls list with the information in the message 7-4. The log information is updated to the UE2, which is an advanced user equipment, in the same way as described above with FIG. 5 with the status update of the first message (i.e. the messages 7-6 and 7-7 correspond to the messages 5-7 and 5-8, respectively), except that in point 7-8 the UE2, instead of identifying, comparing and updating the status, updates the log, i.e. adds the log information to the received calls list. In other words, the fact that a call was answered in the legacy user equipment (or data blocked advanced user equipment) is thus distributed to the user's advanced user equipments so that the received calls lists in each user equipment correspond to each other.

Then the user equipments alerts again. This time the user takes the advanced user equipment UE2, and answers, in point 7-9, the call and the UE2 creates log information on the call, and when the call ends, updates, in point 7-10, the received calls list in the UE2 with the log information. Then, or simultaneously, the UE2 sends a message 7-11 to the XDMS. The message 7-11 may be an XCAP PUT operation.

In response to the message 7-11, the XDMS updates, in point 7-12, the received calls list with the information in message 7-11. The log information is updated to the UE1 in the same way as described above with FIG. 5 with the status update of the second message (i.e. the messages 7-13 to 7-16 correspond to the messages 5-13 to 5-15, respectively), but in point 7-17 the UE2, instead of identifying, comparing and updating the status, adds the log information to the received calls list. Now the history information in the legacy user equipment corresponds to the history information in the advanced user equipment.

Referring to FIGS. 5 and 7, it should be appreciated that if both of the user equipments are legacy equipments (or "data blocked" user equipments), the above procedures described in FIGS. 5 and 7 relating to the UE1 are also implemented with the UE2, and if both are advanced user equipments (allowing data transfer), the above procedures relating to the UE2 are implemented also with the UE1.

Figure 8:
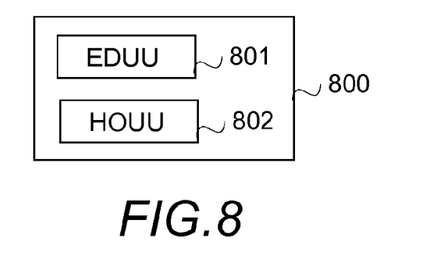
FIG. 8 is a schematic diagram of a user equipment according to an embodiment.

FIG. 8 is a schematic diagram of a user equipment according to an embodiment. The user equipment 800 illustrates an apparatus to which resources on an air interface are allocated and assigned and which may act as an end party to a communication between parties, and thus any feature described herein with user equipment may be implemented with a corresponding apparatus or device/end device. The user equipment 800 refers to a computing device, examples of which include wireless portable mobile communication devices operating with or without a subscriber identification module (SIM), including, but not limited to, the following types of devices: mobile phone, smartphone, personal digital assistant (PDA), handset, laptop computer, ereading device. The user equipment 800 is configured to perform one or more of user equipment functionalities described herein with an embodiment/implementation, and it may be configured to perform functionalities from different embodiments/implementations. For this purpose, the user equipment comprises an event detecting and updating unit (EDUU) 801 for providing a functionality to provide communication-specific history information to other user equipments of the same user according to one or more of the embodiments described herein. In the illustrated example the user equipment also comprises a history obtaining and updating unit (HOUU) 802 for obtaining connection-specific history information of other user equipments of the same user, and updating the history information in the user equipment correspondingly according to one or more of the embodiments described herein.

Depending on an implementation, the event detecting and updating unit and/or the history obtaining and updating unit may be turned on in response to detecting that the subscription with which the user equipment is used is a subscription enabling a multi-apparatus use, and turned off at least partly otherwise; or they are on all the time; or the user may select whether or not he/she wishes to sync history information, and if not, the units are turned off at least partly. When turned off at least partly, the user equipment updates within the user equipment the history information created in the user equipment but does not update other user equipments and/or obtain updates.

As described above, in a legacy user equipment, the event detecting and updating unit may be configured to generate a short message or a USSD message containing the detected event related information, like reading of an unread short message and information identifying the message, and to send the message to the corresponding history function. In addition, but not necessarily, the legacy user equipment may comprise the history obtaining and updating unit which may be configured to receive as automatic updates or obtain history information created by other user equipments of the same user, wherein the obtainment may be implemented as a periodic obtainment (without any user involvement) and/or obtainment in response to a user request. If the legacy user equipment comprises no history obtaining and updating unit, histoTy information created by other user equipments will not be updated to the legacy user equipment.

In an advanced user equipment, the event detecting and updating unit and the history obtaining and updating unit are part of an xdm client implementation. As described above, the functionality of the units in the advanced user equipment may depend on the data mode of the user equipment (i.e. data traffic allowed or blocked). Further, it may be that in the data traffic blocked mode the units are configured merely to update history information within the user equipment (without forwarding history information created in the user equipment to update information in the XDMS), mark the non-forwarded history information so that when the data traffic is allowed, the non-forwarded history information is sent to the XDMS, and changes to history information in the XDMS are obtained. In another embodiment, the advanced user equipment is configured to forward history information towards the XDMS always but to update its own history information by the history information created by other user equipments only when data traffic is allowed (i.e. no updates are retrieved if data traffic is blocked).

The user equipment, an IMS server and/or XDMS, or a corresponding server (element) and corresponding apparatuses implementing a functionality or some functionality according to an embodiment may generally include a processor (not shown in FIGS. 1 and 8), controller, control unit, microcontroller, or the like connected to a memory and to various interfaces of the apparatus. Generally the processor is a central processing unit, but the processor may be an additional operation processor. The entry creation unit 410, and/or the history function unit 420 and/or the event detecting and updating unit 801 and/or the history obtaining and updating unit 802 may be configured as a computer or a processor, or a microprocessor, such as a single-chip computer element, or as a chipset, including at least a memory for providing a storage area used for arithmetic operation and an operation processor for executing the arithmetic operation. The entry creation unit 410, and/or the history function unit 420 and/or the event detecting and updating unit 801 and/or the history obtaining and updating unit 802 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed to carry out one or more functions of one or more embodiments.

Each of the receiving units and the transmitting units (not illustrated in the schematic diagrams) in the apparatuses, such as the above-mentioned servers and user equipments, provides an interface in an apparatus, the interface including a transmitter and/or a receiver or a corresponding means for receiving and/or transmitting information, such as data, contents, control information, messages and for performing necessary functions so that user data, contents, control information, signalling and/or messages can be received and/or transmitted. The receiving and sending units may comprise a set of antennas, the number of which is not limited to any particular number.

The apparatuses, such as the above-mentioned user equipments and servers, may generally include volatile and/or non-volatile memory and typically store contents, data or the like, such as the above-described communication-specific history information and/or the entries. For example, the memory may store computer program code such as software applications (for example, for the entry creation unit 410, and/or the history function unit 420 and/or the event detecting and updating unit 801 and/or the history obtaining and updating unit 802) or operating systems, information, data, contents, or the like for the processor to perform steps associated with the operation of the apparatus in accordance with the embodiments. The memory may be, for example, a random access memory, a hard drive, or another fixed data memory or storage device. Further, the memory, or part of it, may be removable memory detachably connected to the apparatus.

It should be appreciated that the apparatuses may comprise other units used in or for communication-specific history information transmission or for storing. However, they are irrelevant to the actual invention and, therefore, need not be discussed in more detail herein.

Although the above the examples relate to updating existing information (like status information or a log), it should be appreciated that if, for example, the user deletes a short message or empties a log list or deletes some information in the log list in one user equipment, the above-described solution(s) may be used to convey corresponding updates (i.e. deletion or emptying) to other user equipments.

It will be obvious to a person skilled in the art that, as technology advances, the inventive concept can be implemented in various ways. The invention and its embodiments are not limited to the examples described above but may vary within the scope of the claims.

What is claimed is:

1. A method comprising:
supporting, by an apparatus, IP-based messaging to and from the apparatus, the IP-based messaging using data transfer capabilities of the apparatus; and
detecting, in the apparatus, an event creating communication-specific history information;
updating the communication-specific history information in the apparatus;
checking whether or not data transfer is set off in the apparatus; and
sending, in response to the data transfer being set off, the communication-specific history information in a short message via a short message centre to a history function to update the communication-specific history information maintained in a document server.

2. The method of claim 1, further comprising:
associating the communication-specific history information with identifying information identifying the communication to which the communication-specific history information relates.

3. The method of claim 2, wherein the identifying information is a hash value and/or a consecutive number and/or time relating to the event.

4. The method of claim 1, further comprising:
checking, in response to the data transfer being on, whether or not the communication-specific history information relates to a status change of a short message;
sending, in response to the communication-specific history information relating to a status change of a short message, the communication-specific history information in a short message via the short message centre to the history function to update the communication-specific history information in the document server; and sending, in response to the communication-specific history information not relating to a status change of a short message, the communication-specific history information to the document server in an application layer protocol message to update the communication-specific history information in the document server.

5. The method of claim 1, the method further comprising:
sending, in response to the data transfer being on, the communication-specific history information to the document server in an application layer protocol message to update the communication-specific history information in the document server.

6. The method of claim 1, further comprising:
obtaining, in an apparatus, communication-specific history information from a network; and
updating the communication-specific history information in the apparatus accordingly.

7. The method of claim 6, further comprising:
detecting that the communication-specific history information relates to a status change of a message;
using an identifying information included in the obtained communication-specific history information, the identifying information identifying the message;
comparing the obtained status with the status of the identified message in the apparatus; and
updating the status in the apparatus to correspond to the obtained status if they are different.

8. The method of claim 1, wherein the communication-specific history information indicates a status change of a short message or contains log information.

9. An apparatus configured to support IP-based messaging to and from the apparatus, the apparatus comprising:
data transfer capabilities usable for the IP-based messaging;
at least one processor; and
at least one memory including computer program code,
the at least one memory and the computer program code being configured to, with the at least one processor, cause the apparatus at least to:
detect an event that creates communication-specific history information;
update the communication-specific history information in the apparatus;
check whether or not data transfer is set off; and
send, in response to the data transfer being set off, the communication-specific history information in a short message via a short message centre to a history function to update the communication-specific history information maintained in a document server.

10. The apparatus of claim 9, wherein the at least one memory and the computer program code being configured to, with the at least one processor, further cause the apparatus at least to associate the communication-specific history information with identifying information identifying the communication to which the communication-specific history information relates.

11. The apparatus of claim 9, wherein the at least one memory and the computer program code being configured to, with the at least one processor, further cause the apparatus to:
check, in response to the data transfer being on, whether or not the communication-specific history information relates to a status change of a short message;
send, in response to the communication-specific history information relating to a status change of a short message, the communication-specific history information in a short message via the short message centre to the history function to update the communication-specific history information in the document server; and
send, in response to the communication-specific history information not relating to a status change of a short message, the communication-specific history information to the document server in an application layer protocol message to update the communication-specific history information in the document server.

12. The apparatus of claim 9, wherein the at least one memory and the computer program code being configured to, with the at least one processor, further cause the apparatus to send, in response to the data transfer being on, the communication-specific history information to the document server in an application layer protocol message to update the communication-specific history information in the document server.

13. The apparatus of claim 9, wherein the at least one memory and the computer program code being configured to, with the at least one processor, further cause the apparatus to:
obtain communication-specific history information from a network; and
update the communication-specific history information in the apparatus accordingly.

14. The apparatus of claim 13, wherein the at least one memory and the computer program code being configured to, with the at least one processor, further cause the apparatus to:
detect that the communication-specific history information relates to a status change of a message;
use an identifying information included in the obtained communication-specific history information, the identifying information identifying the message;
compare the obtained status with the status of the identified message in the apparatus; and
update the status in the apparatus to correspond to the obtained status if they are different.

15. The apparatus of claim 9, wherein the apparatus is an advanced user equipment.

16. A computer program product comprising a computer usable non-transitory medium having a computer readable program code embedded therein for controlling a data processing apparatus, the computer readable program code configured to cause the data processing apparatus supporting IP-based messaging to and from the data processing apparatus, the IP-based messaging using data transfer capabilities of the data processing apparatus, to execute a process comprising:
detecting an event that creates communication-specific history information;
updating the communication-specific history information in the data processing apparatus;
checking whether or not data transfer is set off in the data processing apparatus; and
sending, in response to the data transfer being set off, the communication-specific history information in a short message via a short message centre to a history function to update the communication-specific history information maintained in a document server.

17. A system supporting a multi-apparatus environment and comprising:
at least one document server for storing in a network-side communication-specific history information;
a first user equipment configured to support IP-based messaging to and from the first user equipment, to use data transfer capabilities for the IP-based messaging, to detect an event that creates communication-specific history information, to update the communication-specific history information in the first user equipment, to check whether or not data transfer is set off, and to send, in response to the data transfer being set off, the communication-specific history information in a short message via a short message centre to a history function to update the communication-specific history information maintained in one of the at least one document server; and a second user equipment that is a legacy user equipment configured to detect an event that creates communication-specific history information, to update, the communication-specific history information in the user equipment, and to send a signalling message to update the communication-specific history information in at least one other apparatus;

wherein the first and second user equipments are usable by one user, and the system is configured to update the communication-specific history information in the first user equipment to correspond to the communication-specific history information in the second user equipment by means of the document server.

18. The system of claim 17, further comprising:

a server delivering multimedia services, the server comprising a history function unit configured to receive communication-specific history information in a short message or in an unstructured supplementary data service message and to forward the communication-specific history information in an application layer protocol message to the document server to be stored as communication-specific history information or to be used for updating the communication-specific history information in the document server.

19. The system of claim 18, wherein the history function unit is further configured to receive an update request in a short message or in an unstructured supplementary data service message, to retrieve new or updated communication-specific history information from the document server, and to send the retrieved information in a short message or in an unstructured supplementary data service message as a response to the update request.

20. The system of claim 17, wherein the document server comprises a history function unit configured to receive communication-specific history information in a short message or in an unstructured supplementary data service message and to forward the communication-specific history information as an internal information exchange to be stored as communication-specific history information or to be used for updating the communication-specific history information in the document server.

* * * * *